Aug. 29, 1961  G. A. LYON  2,998,105
WHEEL STRUCTURE
Filed Oct. 30, 1958  2 Sheets-Sheet 1
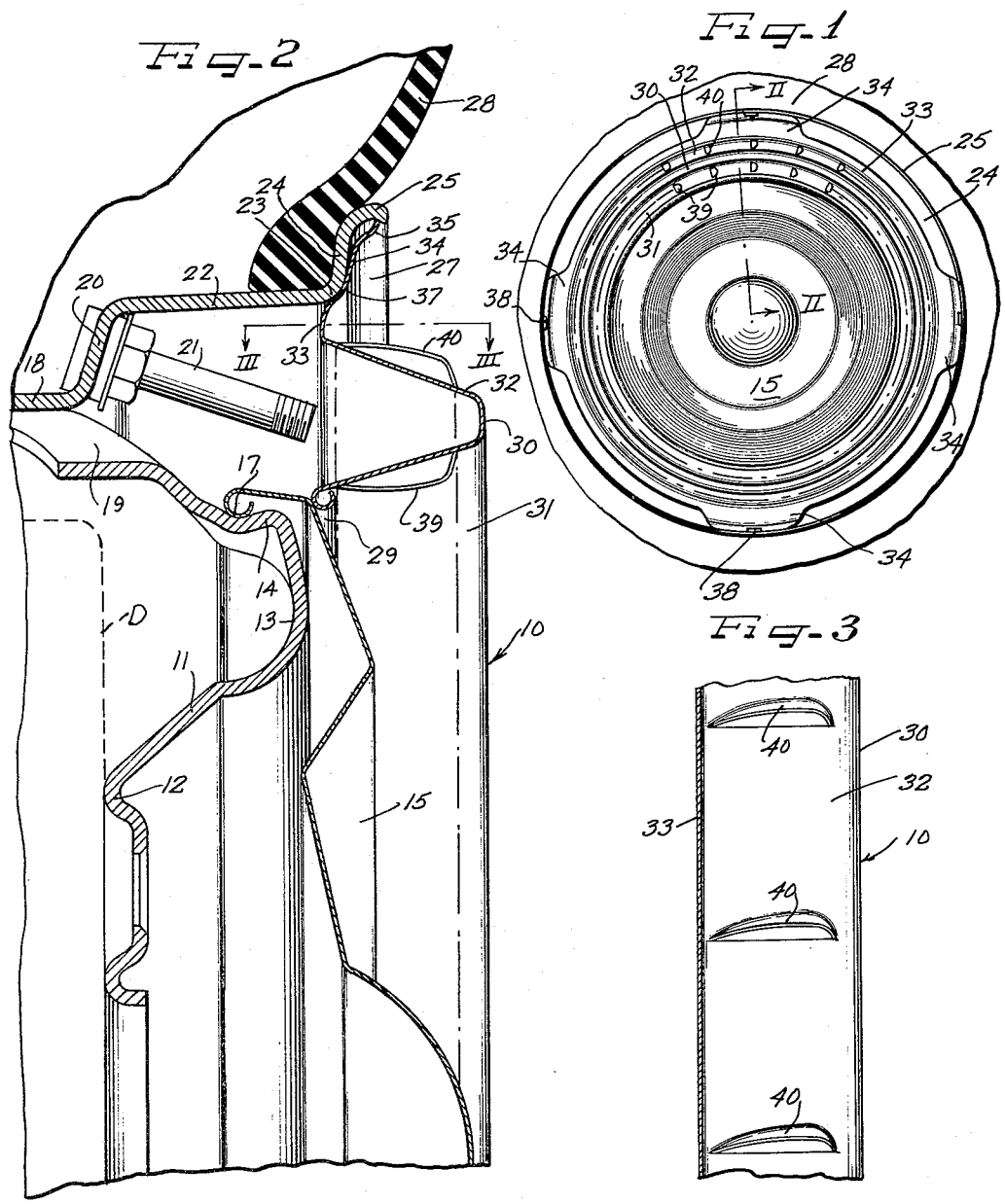
Inventor
George Albert Lyon
by
Attys.

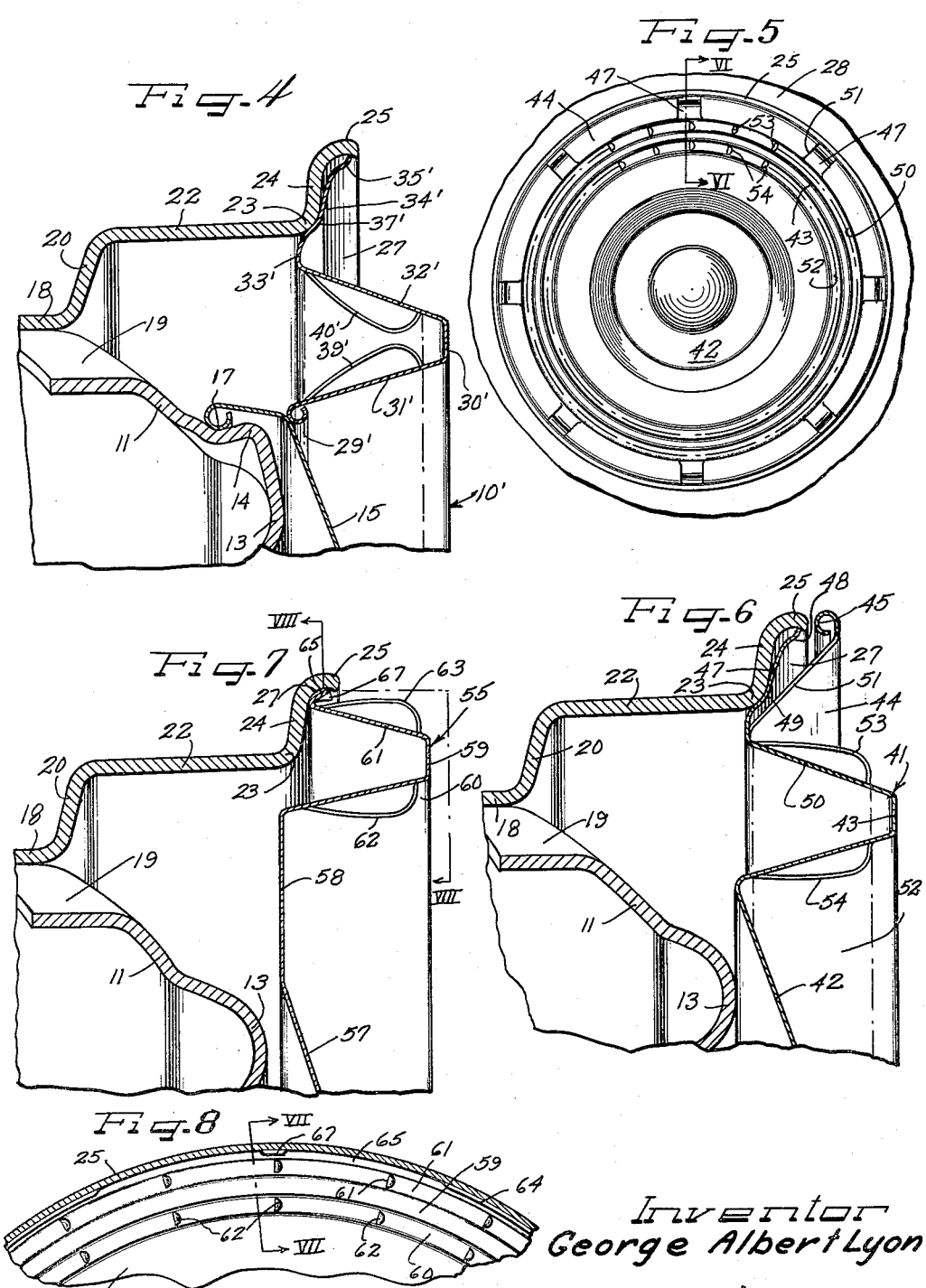

United States Patent Office 2,998,105
Patented Aug. 29, 1961

2,998,105
WHEEL STRUCTURE
George Albert Lyon, 13881 W. Chicago Blvd.,
Detroit 28, Mich.
Filed Oct. 30, 1958, Ser. No. 770,756
9 Claims. (Cl. 188—264)

The present invention relates to improvements in wheel structures and more particularly concerns the ornamental and protective covering of the outer sides of vehicle wheels.

A problem that has been encountered in especially automobile wheels of small size resides in tendency of the brakes associated with the wheel to overheat in service, in consequence of high speeds, coupled with weight of the vehicle, and the substantially encompassed position of the brake drum within the wheel. It is also highly desirable to cover the outer side of the wheel. However, in so doing provision often should desirably be made for enabling circulation of cooling air through the wheel and by way of openings through the wheel.

An important object of the present invention is to provide a wheel structure having improved means for not only covering the outer side of the wheel but also improving circulation of air through the wheel.

Another object of the invention is to provide improved wheel cover means for disposition at the outer side of a vehicle wheel and having novel air circulation promoting means.

A further object of the invention is to provide in a wheel cover construction improved means for assisting in press-on, pry-off disposition of the cover with respect to the outer side of a wheel and also providing novel air circulation promoting structure.

It is a further object of the invention to provide a novel wheel cover construction wherein self-retaining finger means are provided for press-on, pry-off retaining engagement with a wheel part and a reinforcing rib affords a ridge or crest against which wheel applying force may be impressed and such rib also affords means for promoting circulation of air through the wheel in the service running of the wheel on a vehicle.

Other objects, features and advantages of the present invention will be readily apparent from the following detailed description of certain preferred embodiments thereof taken in conjunction with the accompanying drawings, in which:

FIGURE 1 is an outer side elevational view of a wheel structure embodying features of the invention;

FIGURE 2 is an enlarged fragmentary radial sectional detail view taken substantially on the line II—II of FIGURE 1;

FIGURE 3 is a fragmentary sectional elevational detail view taken substantially on the line III—III of FIGURE 2;

FIGURE 4 is a fragmentary radial sectional detail view similar to FIGURE 2 but showing a slight modification;

FIGURE 5 is an outer side elevational view of a wheel structure showing another modification;

FIGURE 6 is an enlarged fragmentary radial sectional detail view taken substantially on the line VI—VI of FIGURE 5;

FIGURE 7 is a fragmentary radial sectional detail view similar to FIGURES 2, 4 and 6 but showing still another modification and taken substantially on the line VII—VII of FIGURE 8; and FIGURE 8 is a fragmentary sectional elevational view taken substantially on the line VIII—VIII of FIGURE 7.

Referring to FIGURES 1–3, a wheel cover construction 10 is constructed and arranged to be applied at the outer side of a vehicle wheel and more particularly an automobile wheel including a wheel body 11 having a central bolt-on flange 12 which is adapted to be secured in the usual manner to a vehicle axle including a brake drum D. An axially outwardly projecting annular nose bulge 13 of the wheel body has on its radially outer side a series of circumferentially spaced generally radially outwardly projecting cover retaining bumps 14 by which a hub cap 15 is adapted to be applied in press-on, pry-off relation over the wheel body, with a marginal terminal bead 17 of the hub cap engaging the retaining bumps 14.

About its circumference, the wheel body 11 carries a drop center, multi-flange tire rim including a base flange 18 secured to the periphery of the wheel body, the periphery of the wheel body having at a plurality of circumferentially spaced points such as four points inset portions providing air circulation openings 19 through the wheel. Extending generally radially outwardly from the axially outer side of the base flange 18 is a side flange 20 of the tire rim carrying a valve stem 21 and merging with a generally axially outwardly extending intermediate flange 22 joining on a juncture shoulder 23 with a generally radially outwardly extending terminal flange portion 24 leading into a generally axially outwardly extending terminal flange lip portion 25 providing a generally radially inwardly opening annular groove 27. A pneumatic tire 28 such as a tubeless tire is adapted to be carried by the tire rim.

As shown, the cover construction 10 comprises an annulus or ring member which is adapted to cooperate with the margin of the hub cap 15 to cover the space intervening between the hub cap and the tire rim and more particularly the substantial axially outwardly opening groove between the wheel body nose bulge 13 and the tire rim within which the valve stem 21 projects and which communicates with the wheel openings 19. If preferred, of course, the cover member 10 and the hub cap 15 may be made as one piece so as to provide a full disk wheel cover which will overlie both the wheel body and the tire rim. In either event, the wheel cover 10 may be made from suitable sheet material such as stainless steel or brass or other suitable material susceptible of drawing or rolling or other satisfactory manufacturing operations and suitable finishing such as polishing and plating.

In a preferred form, the wheel cover member 10 includes a radially inner portion for overlying the wheel body 11 and in this instance also the margin of the hub cap 15 and desirably comprising a substantially rigid circular portion 29 in the form of a turned integral marginal bead adapted in assembly to abut the marginal portion of the hub cap. Radially outwardly from the central bead portion 29 of the cover member is a substantially axially outwardly projecting annular axially substantially rigid rib member 30 having respective radially inner and radially outer annular wall flange portions 31 and 32 divergently related to one another so that within the rib is provided a substantially axially inwardly opening annular groove channel chamber facing toward the axially outwardly opening groove between the nose bulge 13 and the tire rim and forming therewith an air chamber communicating with the wheel openings 19. The inner wall flange 31 extends from the bead 29 generally frusto-conically radially and axially outwardly to the preferably flattened ridge or crest of the rib portion 30, while the radially outer wall flange 32 extends generally frusto-conically radially outwardly and axially inwardly obliquely toward the tire rim and is preferably at its inner margin on a smaller diameter than the axially outer portion of the intermediate flange 22, with a continuous annular generally radially outwardly extending flange 33 projecting into engagement with the rim shoulder 23 in the assembly.

Retention of the cover 10 over the outer side of the wheel is effected by means of cover retaining finger flange extensions 34 from the marginal flange 33 of the cover member 10. In a desirable form there are four of the retaining finger flanges 34 in the form of equidistantly spaced generally radially outwardly projecting arms of substantial width and having retaining edges on short and stiff radially outwardly projecting respective terminals 35 normally projecting to a slightly greater diameter than the diameter inside the groove 27 of the tire rim. Radially inwardly from the terminals 35 the radial section of the retaining fingers 34 is of generally ogee form and providing an inset seat portion 37 engageable bottomingly against the radially inner portion of the terminal flange radially extending portion 24 and the shoulder 23.

In applying the cover member 10 to the outer side of the wheel, the retaining finger arms 34 may be engaged on the axially inner sides of the terminals 35 against the tip of the terminal flange lip 25 and then axially inward pressure applied against the cover member as for example by striking against the crest of the rib portion 30 with a rubber mallet. This forces the retaining finger arms 34 to snap axially inwardly toward the terminal flange portion 24 and causes the terminals 35 to snap past the tip of the terminal flange lip 25 and into retaining engagement within the groove 27 behind the overhanging shoulder provided by the tip of the lip. The construction and relationship is such that in the retaining interengagement of the terminals 35 of the finger arms with the terminal flange portion 25, the retaining finger arms are under resilient tensioned gripping engagement thrusting radially outwardly firmly against the terminal flange lip 25. Furthermore, the radially inner bead portion 29 of the cover is pressed firmly under resilient tension against the margin of the hub cap 15.

Removal of the cover member 10 is easily effected by inserting a pry-off tool (not shown) such as a screwdriver into respective terminal notches 38 in the retaining finger arms 34 and effecting pry-off leverage by fulcruming against the tip of the terminal flange lip 25 for thereby releasing at least two of the finger arms 34 from grip of the terminals 35 thereof with the terminal flange lip.

For circulation of air through the wheel and more particularly the wheel openings 19 in cooling relation to the brake drum D, at least one of the flange walls 31 and 32 of the cover rib 30 is provided with air circulation promoting means, and in this instance preferably both of such flange walls are thus equipped. To this end, the radially inner flange wall 31 is provided with radially inwardly pressed air circulation promoting louvers 39, and the radially outer wall flange 32 is provided with similar radially outwardly pressed louvers 40. Preferably, the louvers 39 and 40 are directed to open in the same circumferential direction so that in rotation of the cover with the wheel in service the louvers 39 and 40 will coact to either scoop air into the chamber within the rib 30 and thus into the wheel groove portion of the air circulation chamber and then axially inwardly through the wheel openings 19, or if the wheel is rotating in the opposite direction so that the openings into the louvers 39 and 40 trail in rotation, air will be aspirated axially outwardly through the wheel. There are as many of the louvers 39 and 40 in circumferential series as preferred, and the louvers may be of any preferred size. It is desirable, however, that the axially outer sides of the louvers be spaced axially inwardly relative to the crest of the rib 30 so as to be free from liability of being struck by a cover-applying mallet and also to be free from being damaged from curbing or the like toward which the crest of the rib 30 may impinge. Otherwise, the louvers 39 and 40 may extend substantially to the axially inner ends of the respective wall flanges 31 and 32. By having the cover rib portion 30 project substantially axially outwardly beyond the tip of the terminal flange lip 25, the louvers 39 and 40 are disposed for effective air circulation promoting action.

In the modification of FIGURE 4, the wheel and the hub cap 15 are identical with FIGURES 1 and 2 therefore similar reference numerals indicate identical parts. However, a wheel cover member 10' is provided which in general respects is the same as the wheel cover 10 of FIGURE 2 and is so indicated by use of primed similar reference numerals, but instead of having the louvers 39' and 40' projecting respectively radially inwardly and radially outwardly from the side wall flanges 31' and 32', respectively, of the cover rib 30', such louvers project into the channel groove within the rib 30' for promoting circulation of air through the wheel and more particularly the openings 19 in the rotation of the cover with the wheel in service.

In the modified form of the invention shown in FIGURES 5 and 6, details of the wheel are the same as in FIGURE 2 and are thus identified by the same reference numerals. In this form, however, a wheel cover 41 of full disk type is shown wherein a central wheel body overlying crown portion 42 is provided for the cover carried by an intermediate axially outwardly projecting rib portion 43 which overlies the axially outwardly opening groove between the nose bulge 13 and the tire rim and also overlies the wheel openings 19 and has at the axially outer side thereof a generally radially and axially outwardly extending tire rim overlying marginal cover portion 44 terminating in a turned reinforcing and finishing bead 45 on a diameter to overlie the tip of the terminal flange lip 25.

For press-on, pry-off retaining interengagement with the wheel, the marginal portion 44 of the cover has struck-out therefrom at circumferentially spaced intervals, such as eight intervals as shown, cover retaining finger arm flanges 47 which have at their radially outer end portions generally radially outwardly extending short and stiff retaining terminals 48 engageable retainingly within the terminal flange groove 27 while adjacent to their radially inner end portions the finger flanges have indented seats 49 engageable with the rim shoulder 23, the radially inner ends of the retaining fingers being connected integrally in one piece with the cover 41 at the axially inner terminus of a radially outer generally radially outwardly and axially inwardly extending wall 50 of the annular projecting rib 43 of the cover. Openings 51 formed in striking out of the retaining fingers 47 afford air circulation through the marginal portion 44 of the cover from within the chamber enclosed by the cover and with which the wheel openings 19 communicate.

At the radially inner side of the rib 43 it has a generally radially and axially outwardly extending wall 52 divergently related to the radially outer wall flange 50 and defining a generally axially inwardly opening channel air chamber that communicates with the wheel chamber therebehind and the air circulation openings 19.

Air circulation through the cover and the wheel is promoted by means of respective series of louvers 53 and 54 on the rib side wall flanges 50 and 52.

Application of the cover 41 to the outer side of the wheel may be effected similarly as described for the cover 10, a mallet being utilized to force the cover home by striking against the crest of the rib 43. Removal of the cover 41 from the wheel may be effected by inserting a pry-off tool behind the terminal bead 45 of the cover and effecting pry-off leverage for snapping the retaining finger members 47 from within the groove 27. In this form of the cover, the terminal bead 45 serves as a positive stop against overstressing of the cover axially inwardly since the bead 45 will engage the tip of the terminal flange lip 25 on limited axially inward movement of the cover as enabled by flexible action of the resilient retaining finger 47. This limit upon axially inward movement prevents overstressing of the fingers 47 either during application of the cover or as a result of curbing or other pressure axially inwardly against the cover.

In FIGURES 7 and 8 a cover 55 of the full disk type is shown which is constructed and arranged to be applied over the outer side of the same wheel as shown in FIGURE 2 and therefore the same reference numerals are used in identifying corresponding parts in the wheel in FIGURES 7 and 8. In this instance, the cover 55 has a central wheel body overlying crown portion 57 and an intermediate annular portion 58 which generally overlies the wheel openings 19 and has at its radially outer side a generally axially outwardly projecting annular air circulation chamber rib 59 provided with diverging side walls 60 and 61 at respectively its radially inner and outer sides formed with respective air circulation promoting louvers 62 and 63. In this instance, the rib 59 overlies the tire rim inclusive of the tire rim terminal flange portion 24, with the axially inner terminus of the rib flange wall 61 arranged to bottom against the terminal flange portion 24 adjacent to the terminal flange lip portion 25.

For retaining the cover 55 on the outer side of the wheel, the radially outer wall flange 61 is provided on its terminus with a generally return-bent continuous annular flange 64 which is short and stiff and of generally smaller diameter than the diameter on the inner side of the tip of the terminal flange lip 25 so as to be freely movable in telescopic relation into the lip flange. However, at suitable circumferentially spaced intervals such as four, the return-bent terminal flange 64 has radially outwardly pressed, offset retaining finger projections 65 which normally extend to a slightly greater diameter than the inside diameter within the rim groove 27. Thereby, by pressing the cover axially inwardly through pressure applied to the crest of the axially outwardly projecting rib 59, the retaining finger terminal portions 65 are snapped into engagement within the groove 27 behind the shoulder provided by the overhanging tip of the terminal flange lip 25. Since the return-bent terminal flange 64 is quite stiff and is further stiffened by the offsetting of the retaining finger portions 65 thereof, resilient deflectability for enabling snapping in of the retaining finger portions 65 is afforded by resilience of the wall flange 61 of the cover ribs 59.

Removal of the cover 55 can be easily effected by insertion of a pry-off tool (not shown) such as a screwdriver into inset notches 67 provided for this purpose midway the width of the finger portions 65 whereby upon inserting the tip of the tool into a respective notch 67 and effecting generally radially inward leverage the retaining finger portion engaged will be resiliently radially inwardly deflected and released from engagement behind the shoulder afforded by the groove 27 of the tire rim.

It will be understood that modifications and variations may be effected without departing from the scope of the novel concepts of the present invention.

I claim as my invention:

1. In a wheel structure including a wheel body and a tire rim with air circulation openings through the wheel body adjacent to the tire rim, a cover member for disposition over the outer side of the wheel including a circular generally axially outwardly projecting rib portion of a diameter to at least partially overlie the tire rim and providing an axially inwardly opening annular groove channel chamber in air circulation communication with said wheel openings, said rib portion having a radially outer generally axially inwardly and radially outwardly sloping wall provided at its axially inner terminus with generally radially outwardly projecting cover retaining means engageable in press-on, pry-off relation with the tire rim, and air circulation louvers in said rib wall and promoting air circulation through said groove chamber and said wheel openings in the service running rotation of the wheel, said rib portion having a crest ridge spaced axially outwardly from said louvers and being adapted to serve as a mallet buffer to be stroked by a rubber mallet in driving the cover member home onto the wheel, said retaining means of the cover member comprising a generally radially outwardly projecting annular flange joined to the axially inner portion of said rib wall and having projecting generally radially outwardly therefrom a circumferentially spaced plurality of cover retaining finger arms engageable with the tire rim under resilient tension thrust.

2. In a wheel structure including a wheel body and a tire rim with air circulation openings through the wheel body adjacent to the tire rim, a cover member for disposition over the outer side of the wheel including a circular generally axially outwardly projecting rib portion of a diameter to at least partially overlie the tire rim and providing an axially inwardly opening annular groove channel chamber in air circulation communication with said wheel openings, said rib portion having a radially outer generally axially inwardly and radially outwardly sloping wall provided at its axially inner terminus with generally radially outwardly projecting cover retaining means engageable in press-on, pry-off relation with the tire rim, and air circulation louvers in said rib wall and promoting air circulation through said groove chamber and said wheel openings in the service running rotation of the wheel, said rib portion having a crest ridge spaced axially outwardly from said louvers and being adapted to serve as a mallet buffer to be stroked by a rubber mallet in driving the cover member home onto the wheel, said cover retaining means comprising a turned short and stiff continuous axially outwardly as well as radially outwardly projecting annular flange on the axially inner terminus of said rib wall and such annular flange having at a plurality of circumferentially spaced points radially outwardly offset retaining finger portions engageable with the tire rim.

3. In a wheel structure including a wheel body and a tire rim with air circulation openings through the wheel body adjacent to the tire rim, a cover member for disposition over the outer side of the wheel including a circular generally axially outwardly projecting rib portion of a diameter to at least partially overlie the tire rim and providing an axially inwardly opening annular groove channel chamber in air circulation communication with said wheel openings, said rib portion having a radially outer generally axially inwardly and radially outwardly sloping wall provided at its axially inner terminus with generally radially outwardly projecting cover retaining means engageable in press-on, pry-off relation with the tire rim, and air circulation louvers in said rib wall and promoting air circulation through said groove chamber and said wheel openings in the service running rotation of the wheel, said rib portion having a crest ridge spaced axially outwardly from said louvers and being adapted to serve as a mallet buffer to be stroked by a rubber mallet in driving the cover member home onto the wheel, said retaining means comprising a circumferentially spaced series of retaining fingers struck from a tire rim overlying marginal flange projecting generally radially and axially outwardly from the rib wall.

4. In a cover member for disposition over the outer side of a vehicle wheel, a circular cover body having an intermediate axially outwardly projecting circular rib portion providing a rigid crest ridge for engagement by a mallet in driving the cover home onto a wheel, said rib portion having a generally radially facing wall provided with louvers for promoting air circulation through the cover and through openings in a wheel to which the cover member may be applied, said wall having an axially inner terminus provided with generally radially projecting cover retaining flange structure, said cover retaining flange structure comprising a continuous annular short and stiff return-bent flange having at intervals generally radially offset projecting finger portions retainingly engageable with a flange portion of a wheel and said rib wall being resiliently flexible responsive to deflectional pressures against said finger portions.

5. In a wheel structure including a tire rim having a terminal flange, a cover for disposition over the outer side of the wheel including a radially outer flange marginal portion for overlying the terminal flange and having a turned terminus opposing the tip of the terminal flange, and a plurality of circumferentially spaced cover retaining fingers struck from said marginal flange portion and projecting therebehind generally radially outwardly behind and across strike-out openings in said flange portion and engageable in press-on, pry-off relation with the terminal flange and supporting the cover marginal flange in spaced relation to the terminal flange and with said turned terminus in limited spaced relation to the tip of the terminal flange and providing a stop to limit axially inward deflection of the cover.

6. In a wheel structure including a tire rim having a terminal flange, a cover for disposition over the outer side of the wheel including a radially outer flange marginal portion for overlying the terminal flange and having a turned terminus opposing the tip of the terminal flange, and a plurality of circumferentially spaced cover retaining fingers struck from said marginal flange and projecting therebehind generally radially outwardly and engageable in press-on, pry-off relation with the terminal flange and supporting the cover marginal flange in spaced relation to the terminal flange and with said turned terminus in limited spaced relation to the tip of the terminal flange and providing a stop to limit axially inward deflection of the cover, said cover having radially inwardly adjacent to said marginal flange a generally axially outwardly projecting buffer and air circulation promoting rib projecting substantially axially outwardly beyond the maximum axially outward projection of said marginal flange and having a mallet engageable rigid crest ridge and a generally radially facing flange wall having air circulation promoting louvers pressed therefrom for promoting circulation of air through the cover and through openings in the wheel.

7. In a cover for disposition over the outer side of a vehicle wheel, a circular cover member having a marginal tire rim overlying flange having struck therefrom cover retaining fingers extending therebehind and engageable with the tire rim, the flange having openings where the fingers are struck out for air circulation therethrough, the cover having radially inwardly adjacent to said marginal flange an axially outwardly projecting buffer rib provided with a radially facing flange wall having louvers pressed therein and affording louvered openings in addition to said finger openings for air circulation through the cover.

8. In a wheel structure including a wheel body and a tire rim with openings adjacent juncture of the body and tire rim, and the tire rim having an intermediate flange which joins a terminal flange projecting generally radially outwardly from the axially outer end of the intermediate flange and with a generally axially outwardly extending lip flange portion at the radially outer end of the radially outwardly extending terminal flange portion, a circular cover member for disposition over the outer side of the wheel having a generally axially outwardly extending annular substantially rigid rib member provided with diverging radially inner and radially outer walls affording an axially outer crest receptive of a mallet thereagainst in applying the cover to the wheel, said walls having openings defined by louvers and adapted to promote air circulation through the rib and through said wheel openings, the radially outer of said walls having the axially inner terminus adjacent to said radially extending portion of the terminal flange and provided with flange structure thereon extending generally radially outwardly from said terminus and engaging said radially extending terminal flange portion to define the axially inward disposition of said rib, said flange structure including generally radially and axially outwardly extending fingers retainingly grippingly engaging a radially inwardly facing surface of said terminal flange lip under resilient tension.

9. In a wheel structure as defined in claim 8 wherein said fingers provide seating portions which engage against said radially extending terminal flange portion and with terminals of the fingers diverging from said radially extending terminal flange portion into engagement with said lip portion.

References Cited in the file of this patent

UNITED STATES PATENTS

| 2,433,854 | Lyon | Jan. 6, 1948 |
| 2,690,357 | Lyon | Sept. 28, 1954 |
| 2,757,980 | Lyon | Aug. 7, 1956 |
| 2,772,924 | Landell | Dec. 4, 1956 |
| 2,806,742 | Lyon | Sept. 17, 1957 |
| 2,808,909 | Lyon | Oct. 8, 1957 |
| 2,857,210 | Lyon | Oct. 21, 1958 |
| 2,926,045 | Lyon | Feb. 23, 1960 |

FOREIGN PATENTS

| 524,139 | Canada | Apr. 24, 1956 |